(12) United States Patent
Ohmori

(10) Patent No.: US 11,613,320 B2
(45) Date of Patent: Mar. 28, 2023

(54) ADJUSTMENT JIG AND ADJUSTMENT METHOD

(71) Applicant: HONDA MOTOR CO., LTD., Tokyo (JP)

(72) Inventor: Eiji Ohmori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/471,348

(22) Filed: Sep. 10, 2021

(65) Prior Publication Data

US 2022/0089236 A1   Mar. 24, 2022

(30) Foreign Application Priority Data

Sep. 23, 2020   (JP) .............................. JP2020-158818

(51) Int. Cl.
*B62D 65/02* (2006.01)
*B60S 5/00* (2006.01)
*B62D 65/00* (2006.01)

(52) U.S. Cl.
CPC .............. *B62D 65/026* (2013.01); *B60S 5/00* (2013.01); *B62D 65/005* (2013.01)

(58) Field of Classification Search
CPC ........ B62D 65/026; B62D 65/005; B60S 5/00
See application file for complete search history.

(56) References Cited

U.S. PATENT DOCUMENTS 6,363,619 B1 *   4/2002   Schirmer ............. G01M 11/067
33/600

FOREIGN PATENT DOCUMENTS

JP        63-47021 U     3/1988
JP        2001-260826 A   9/2001

* cited by examiner

*Primary Examiner* — Nirvana Deonauth
(74) *Attorney, Agent, or Firm* — WHDA, LLP

(57) ABSTRACT

There is provided an adjustment jig. A fixing unit has a plate shape and is detachably fixed to an attachment unit of a sensor provided on a vehicle side. An extension unit is provided to extend from the fixing unit. A suspension unit is suspended from the extension unit.

8 Claims, 10 Drawing Sheets

F I G. 1
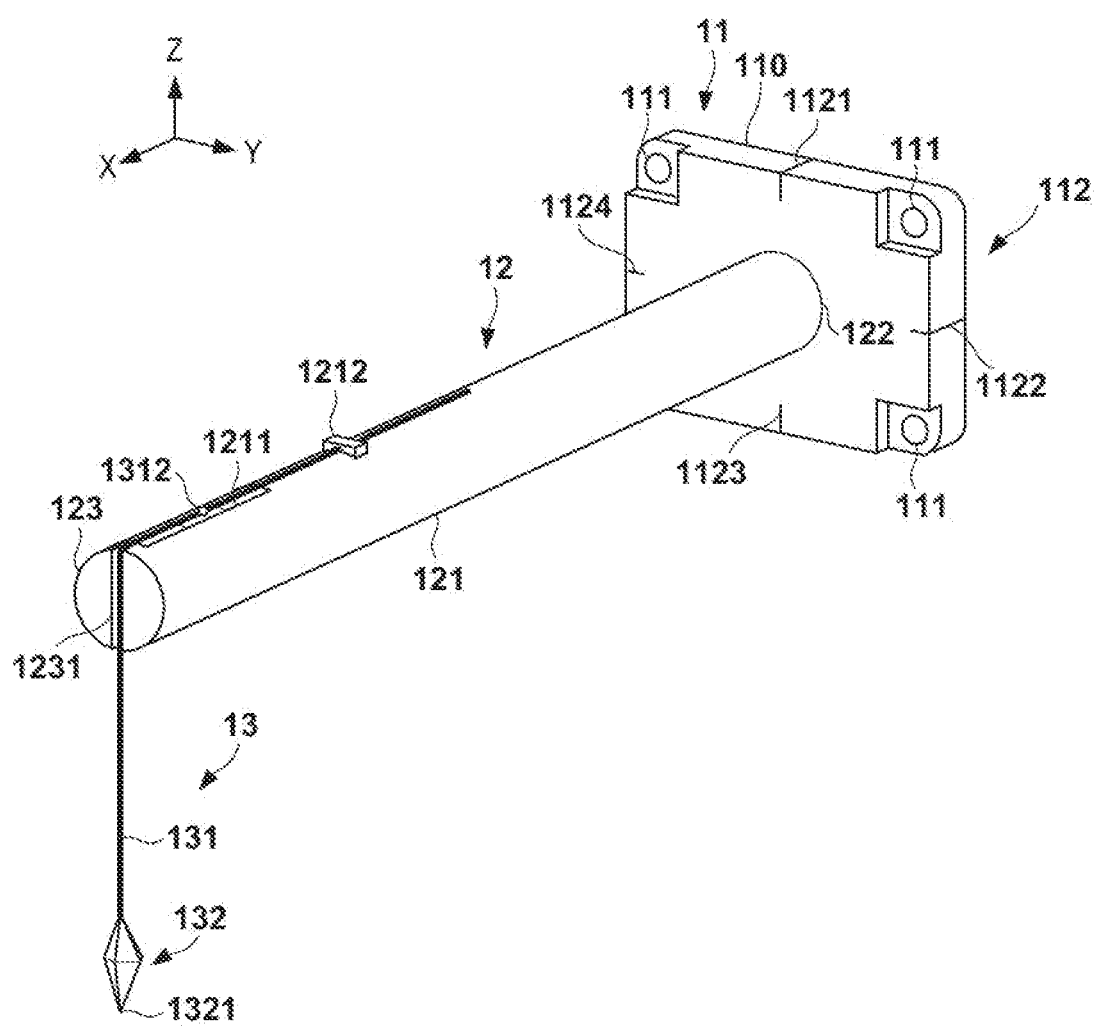

ADJUSTMENT JIG AND ADJUSTMENT METHOD

CROSS-REFERENCE TO RELATED APPLICATION(S)

This application claims priority to and the benefit of Japanese Patent Application No. 2020-158818 filed on Sep. 23, 2020, the entire disclosure of which is incorporated herein by reference.

BACKGROUND OF THE INVENTION

Field of the Invention

The present invention relates to an adjustment jig and an adjustment method.

Description of the Related Art

Jigs for correcting deformation that has occurred in a vehicle body of an automobile are conventionally known. Japanese Utility Model Publication No. 63-47021 discloses that deformation of a steel sheet is corrected by welding a repair jig to the deformed steel sheet and applying force such as tension. Further, Japanese Patent Laid-Open No. 2001-260826 discloses a jig that is attachable to a strut insulator assembly unit of a vehicle body and that corrects deformation of the vehicle body.

SUMMARY OF THE INVENTION

According to one embodiment of the present invention, there is provided an adjustment jig comprising: a fixing unit having a plate shape and configured to be detachably fixed to an attachment unit of a sensor provided on a vehicle side; an extension unit provided to extend from the fixing unit; and a suspension unit configured to be suspended from the extension unit.

According to another embodiment of the present invention, there is provided an adjustment method using the adjustment jig of the above embodiment, the adjustment method comprising: setting a target position in a position adjustment of the attachment unit; fixing the fixing unit to the attachment unit; and adjusting a position of the adjustment jig to make the target position set in the setting coincide with a position indicated by the suspension unit.

BRIEF DESCRIPTION OF THE DRAWINGS

FIG. 1 is a perspective view schematically illustrating an adjustment jig according to an embodiment;

DESCRIPTION OF THE EMBODIMENTS

Figure 2A:
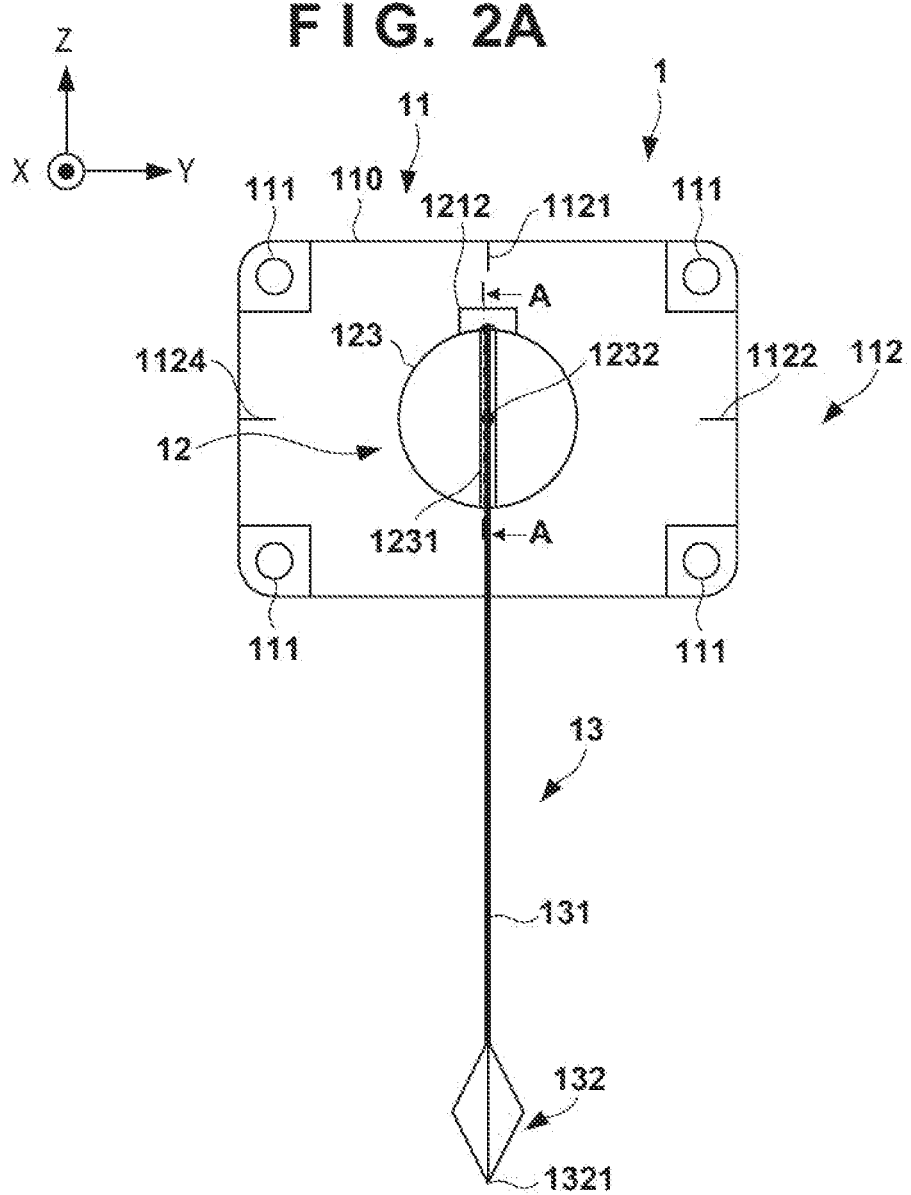
FIG. 2A is a front view of the adjustment jig of FIG. 1.

In these years, by the way, external sensors used for automated driving control, driving assistance control, or the like are provided at the circumference of a vehicle, in some cases. In a case where deformation occurs at an attachment unit of an external sensor due to a collision or the like in a vehicle provided with the external sensor, the detection range of the external sensor may deviate. In such a case, it becomes necessary to correct the deformation that has occurred, in some cases. However, in the above-described conventional technique, it may take time for the position adjustment of the attachment unit of the external sensor, or the finished result may depend on the skill of a worker.

According to an embodiment of the present invention, a technique for easily adjusting an attachment unit of an external sensor is provided.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 2B:
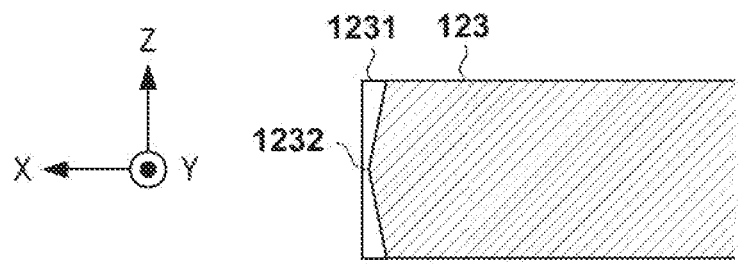
FIG. 2B is a cross-sectional view taken along line A-A of FIG. 2A.
Figure 3:
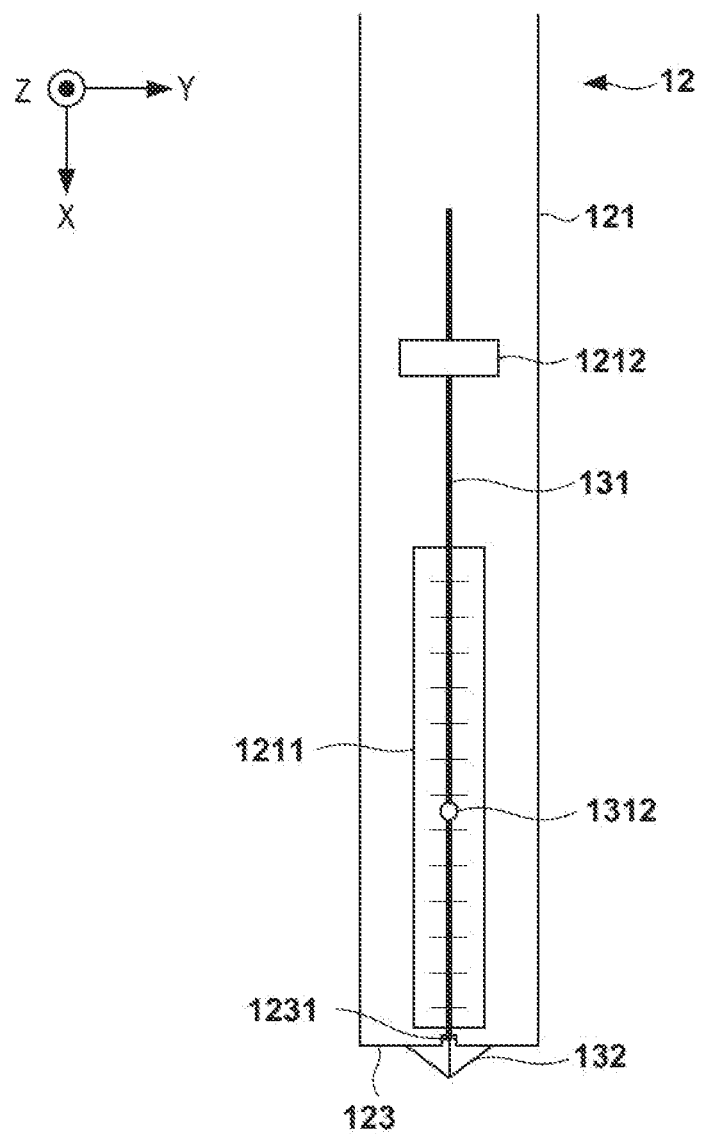
FIG. 3 is a plan view of the adjustment jig of FIG. 1.

Configuration of Jig (FIGS. 1 to 3)

FIG. 1 is a perspective view schematically illustrating an adjustment jig 1 according to an embodiment. FIG. 2A is a front view of the adjustment jig 1 of FIG. 1. FIG. 2B is a cross-sectional view taken along line A-A of FIG. 2A. FIG. 3 is a plan view of the adjustment jig 1 of FIG. 1, in which the configuration is partially omitted. Note that in FIG. 1, the adjustment jig 1 is illustrated such that an up-and-down direction when the adjustment jig 1 is attached to an attachment unit 311 to be described later is Z-axis direction. In the following description, unless otherwise specified, the up-and-down direction of the adjustment jig 1 indicates Z-axis direction.

Figure 5:
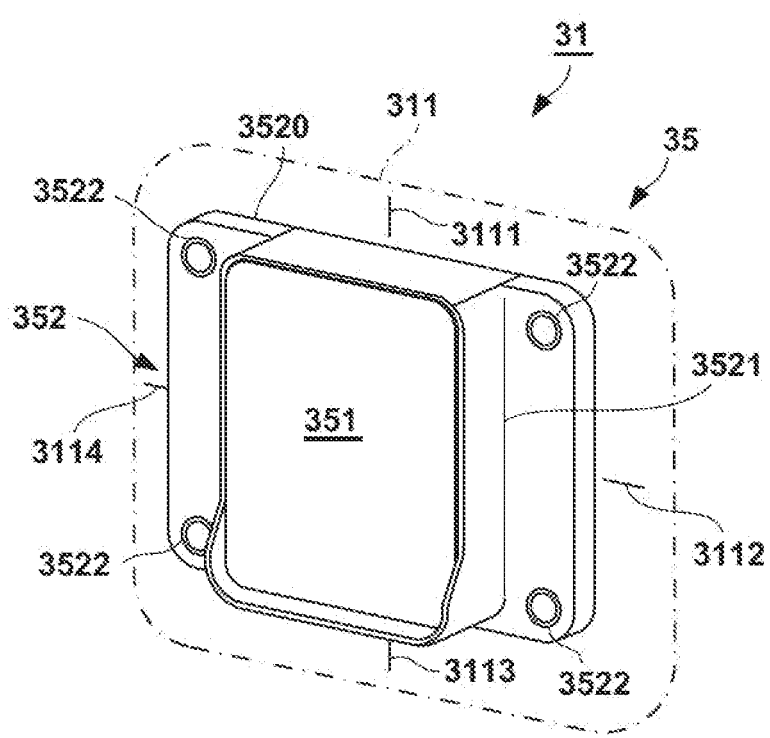
FIG. 5 is a diagram illustrating a configuration example of a sensor unit and an attachment example of the sensor unit to a vehicle.

The adjustment jig 1 is a jig for adjusting the position of the attachment unit 311 of a sensor to be provided in the vehicle (see FIG. 5). The adjustment jig 1 includes a fixing unit 11, an extension unit 12, and a suspension unit 13.

(Fixing Unit)

The fixing unit 11 is a plate-shaped part detachably fixed to the attachment unit 311 of the sensor provided on the vehicle side. The fixing unit 11 includes a plate-shaped main body 110, and holes 111 and an alignment portion 112, which are formed in the main body 110.

The main body 110 is a member that defines an outer shape of the fixing unit 11. The main body 110 is formed of, for example, a metal material. In addition, in the present embodiment, the main body 110 is formed of a substantially rectangular flat plate.

The holes 111 are used as bolt holes when the fixing unit 11 is fixed to the attachment unit 311. That is, the fixing unit 11 is fixed to the attachment unit 311 by bolt fastening. In the present embodiment, the holes 111 are respectively formed at four corners of the main body 110. In addition, in the present embodiment, a so-called countersunk hole process is performed around the hole 111, and thus reduces a bolt load at the time of bolt fastening.

The alignment portion 112 is used as a mark for aligning the fixing unit 11 with respect to the attachment unit 311. In the present embodiment, the alignment portion 112 includes four markers 1121 to 1124 formed at the centers on the respective sides of a front surface and side surfaces of the main body 110. The markers 1121 to 1124 may be formed, for example, by cutting the surfaces of the main body 110, or may be configured by coloring the main body 110 with ink or the like. In the present embodiment, markers 3111 to 3114 (see FIG. 5) are provided on the attachment unit 311 side at positions corresponding to the alignment portion 112. The markers 1121 to 1124 and the markers 3111 to 3114 are respectively aligned with each other with the fixing unit 11 fixed to the attachment unit 311, so the center position of the fixing unit 11 and the center position of the attachment unit 311 can be aligned with each other. In addition, in the present embodiment, the markers 1121 to 1124 are formed not only on the front surface but also on the side surfaces of the main body 110. Therefore, a deviation at the time of alignment can be suppressed, and the alignment with the markers 3111 to 3114 on the attachment unit 311 side is enabled in a more accurate manner than a case where the markers 1121 to 1124 are provided only on the front surface of the main body 110.

Note that in the present embodiment, in order to enable the position adjustment of the fixing unit 11 with respect to the attachment unit 311 by using the alignment portion 112, the diameters of the holes 111 are set to be loose with respect to the bolt diameters. For example, the diameters of the holes 111 may be set to 1.2 to 1.5 times.

(Extension Unit)

The extension unit 12 is a portion to be gripped by a worker at the time of adjusting the position of the attachment unit 311, and thus functions as an operation portion for operating the adjustment jig 1. The extension unit 12 is a part provided to extend from the front surface of the main body 110 of the fixing unit 11. More specifically speaking, the extension unit 12 extends perpendicularly to the front surface from the central part of the front surface of the main body 110. That is, the extension unit 12 is provided such that the center position of the extension unit 12 and the center position of the main body 110 coincide with each other, when the adjustment jig 1 is viewed from the front. In the present embodiment, the extension unit 12 has a rod shape. More specifically, the extension unit 12 has a round bar shape. However, the shape of the extension unit 12 is not limited. The extension unit 12 includes a cylindrical body portion 121, a connection end portion 122, which is one end of the body portion 121 and which is connected with the fixing unit 11, and a tip end portion 123, which is an end portion of the body portion 121 on an opposite side to the connection end portion 122.

The body portion 121 constitutes an outer shape of the extension unit 12. In addition, the body portion 121 includes a scale 1211 for measuring a distance in a vertical direction from the extension unit 12 to a weight 132 of the suspension unit 13 to be described later. Further, the body portion 121 includes a distance adjustment unit 1212 that adjusts the distance from the extension unit 12 to the weight 132. These configurations will be described later.

The connection end portion 122 is welded with the main body 110 of the fixing unit 11 in the present embodiment. As described above, when adjusting the position of the attachment unit 311, the worker grips the extension unit 12 and applies force to the attachment unit 311. For this end, the connection end portion 122 is welded with the fixing unit 11 to ensure the connection strength of these portions.

The tip end portion 123 includes a guide portion 1231 that guides a linear member 131.

The guide portion 1231 guides the linear member 131 so that the linear member 131 of the suspension unit 13, to be described later, passes through a center 1232 of the tip end portion 123. In the present embodiment, the guide portion 1231 is a groove formed on a tip end surface of the tip end portion 123. This groove is formed between the top and the bottom across the tip end surface of the tip end portion 123, while passing through the center 1232 of the tip end portion 123 in a front view. As described above, in the present embodiment, the center position of the extension unit 12 and the center position of the main body 110 coincide with each other in a front view. Therefore, the guide portion 1231 guides the linear member 131 so that the linear member 131 passes through the center position of the attachment unit 311, when viewed from the front of the adjustment jig 1 with the adjustment jig 1 attached to the attachment unit 311.

In the present embodiment, the cross-sectional shape of the groove of the guide portion 1231 taken along line A-A is a shape in which the center in the up-and-down direction (Z direction) protrudes toward the tip end side of the extension unit 12. In other words, the groove of the guide portion 1231 has a triangular cross-section, when the adjustment jig 1 is viewed from a lateral side (Y direction). Here, in a case where the cross-sectional shape of the groove is a vertically linear one, when the tip end portion 123 faces upward at the time of attaching the adjustment jig 1, the linear member 131 suspends vertically from a lower end of the groove. That is, a part from the center to the lower end of the groove interferes with the linear member 131, and the position at which the linear member 131 suspends is deviated in +X direction with respect to the center 1232 of the tip end portion 123. In the present embodiment, by forming the cross-sectional shape of the groove of the guide portion 1231 into a triangular cross-section, it is possible to suppress the interference between the part from the center to the lower end of the groove and the linear member 131. Therefore, even when the extension unit 12 faces upward with respect to a floor surface at the time of attaching the adjustment jig 1 to the attachment unit 311, the linear member 131 is suspended vertically from the center point in the up-and-down direction of the groove.

(Suspension Unit)

The suspension unit 13 is a component element for aligning the position of the extension unit 12 with a target position formed on the ground, for example. More specifically speaking, the suspension unit 13 is used for adjusting the position of the attachment unit 311 by aligning the tip end portion 123 of the extension unit 12 with a target position that has been set by a method to be described later. The suspension unit 13 may be referred to as a plumb line. The suspension unit 13 includes the linear member 131 and the weight 132.

The linear member 131 is a member for suspending the weight 132. The linear member 131 is located on the upper surface of the body portion 121, a part of the tip end portion 123 along the guide portion 1231, and below the tip end portion 123. The linear member 131 may be, for example, a metal wire or a thread formed of any other fiber.

In the present embodiment, the linear member 131 is attached by the distance adjustment unit 1212 so that the length of a part that suspends from the tip end portion 123 can be changed. Specifically, the distance adjustment unit 1212 is slidably provided along the axial direction of the body portion 121 with the linear member 131 fixed to the distance adjustment unit 1212. Accordingly, as the distance adjustment unit 1212 slides, the length of the part that suspends from the tip end portion 123 changes. Note that the configuration of the distance adjustment unit 1212 is not limited. For example, fixing and releasing the linear member 131 may be switchable by the distance adjustment unit 1212 without sliding along the body portion 121.

Further, the linear member 131 is provided with a marker 1312 for reading the scale 1211 provided in the extension unit 12. For example, the distance from the marker 1312 to a tip end portion 1321 of the weight 132 is defined beforehand, and the height of the extension unit 12 is calculated, based on such a defined distance and a read value of the scale 1211 at the position where the marker 1312 is located.

In the present embodiment, the marker 1312 is a spherical member fixed at a predetermined position of the linear member 131. However, the shape of the marker 1312 is not limited, and may be, for example, a rod-like shape extending in a direction (Y direction) that intersects the axial direction of the extension unit 12. In addition, a part of the linear member 131 that is colored or the like may be used as the marker 1312 without any other member attached to the linear member 131.

The weight 132 is for vertically suspending the linear member 131 from the extension unit 12 by gravity. The weight 132 is attached to one end of the linear member 131. The weight 132 can be made of a metal, for example, iron, aluminum, lead, or the like. In the present embodiment, the weight 132 has an octahedral shape elongated vertically in one direction. However, the shape of the weight 132 can be changed appropriately. However, the tip end portion 1321 on a lower side is formed into an acute-angled shape at the time of being suspended, and thus alignment with a target position provided on a grounding surface or the like of the vehicle is easily enabled.

Figure 4:
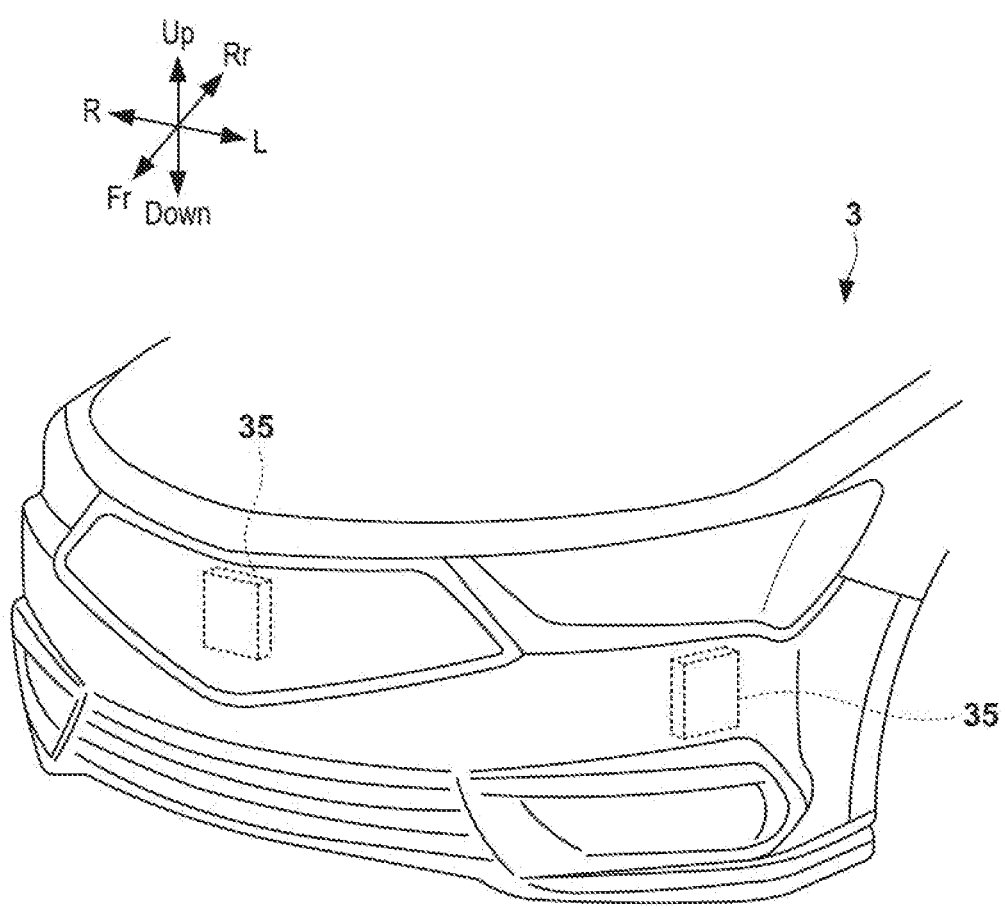
FIG. 4 is a diagram illustrating an arrangement example of sensor units mounted on a vehicle.

Configuration and Arrangement Example of External Sensor (FIGS. 4 to 5)

FIG. 4 is a diagram illustrating an arrangement example of sensor units 35 mounted on a vehicle 3. Note that in FIG. 4, "front (Fr)", "rear (Rr)", "left (L)", "right (R)", "Up", and "Down" are directions when viewed from the driver The sensor units 35 are attached to the vehicle 3, and each function as an external sensor for detecting a target object around itself and measuring a distance to the target object. The external sensor can be a light detection and ranging (LIDAR), a millimeter wave radar, a sonar using sound waves, or the like, and FIG. 4 illustrates an arrangement example of the millimeter wave radar. FIG. 4 illustrates the sensor unit 35 provided on a forward side of the front face and the sensor unit 35 provided on a left front side, when viewed from the driver's seat. Note that the sensor units 35 are not limited to the positions illustrated in FIG. 4, and can be provided on a right front side, a lateral side, a rear side, or the like, as appropriate.

FIG. 5 illustrates a configuration example of the sensor unit 35 and an attachment example of the sensor unit 35 to the vehicle 3. The sensor unit 35 includes a detection unit 351 and a bracket 352. Note that in FIG. 5, in order to describe the configuration of the sensor unit 35, bolts for fixing the sensor unit 35 to the attachment unit 311 are omitted.

The detection unit 351 is a millimeter wave radar main body. The detection unit 351 includes several electronic components that achieve the functionality of a radar, a connector for outputting detection results to the outside, and the like.

The bracket 352 is a member for attaching the detection unit 351 to the attachment unit 311. The bracket 352 includes a base portion 3520, a holding portion 3521, and holes 3522.

The base portion 3520 is a flat plate-shaped part forming the base of the bracket 352. The base portion 3520 is formed of, for example, a metal material such as aluminum, a resin, or the like. The size of a planar part of the base portion 3520 can be substantially equal to the size of a planar portion of the fixing unit 11. Note that a marker or the like for alignment with the attachment unit 311 may be formed on the base portion 3520 like the alignment portion 112 provided in the fixing unit 11 of the adjustment jig 1.

The holding portion 3521 detachably holds the detection unit 351. As a configuration of the holding portion 3521, a known technique can be adopted appropriately. However, for example, the holding portion 3521 can include a claw portion or the like that engages the detection unit 351, in a case where the detection unit 351 is located at a hold position. In addition, an opening or the like through which the connector of the detection unit 351 passes can be formed in the holding portion 3521.

The holes 3522 are used for attaching the sensor unit 35 to the attachment unit 311. In the present embodiment, the holes 3522 are bolt holes, and the sensor unit 35 is attached to the attachment unit 311 of the vehicle 3 by bolt fastening. The holes 3522 are respectively provided at four corners of the base portion 3520 at the same intervals with those of the holes 111 of the adjustment jig 1. That is, the adjustment jig 1 and the sensor unit 35 area attachable to the identical attachment unit 311.

Next, an attachment mode of the sensor unit 35 to the attachment unit 311 will be described. The sensor unit 35 can be directly or indirectly attached to a vehicle body frame 31 or the like forming the framework of the vehicle 3. FIG. 5 illustrates a case where the sensor unit 35 is directly attached to the vehicle body frame 31 of the vehicle 3. In the present embodiment, the attachment unit 311 is a flat attachment surface formed on the vehicle body frame 31 of the vehicle 3. For example, bolt holes (not illustrated) respectively formed with female screws may be formed in the attachment unit 311 to screw the bolts into the bolt holes of the attachment unit 311 through the holes 3522, so that the sensor unit 35 may be fixed to the attachment unit 311. Further, for example, the sensor unit 35 may be fixed to the attachment unit 311 by bolts and nuts.

In addition, in the present embodiment, the markers 3111 to 3114 are provided on the attachment unit 311 at positions corresponding to the alignment portion 112 of the adjustment jig 1. Specifically, in a case where the markers 3111 to 3114 and the markers 1121 to 1124 are respectively aligned with each other, the markers 3111 to 3114 are provided such that the center position of the fixing unit 11 coincides with the center position of the attachment unit 311, which is the attachment surface. Accordingly, it is possible to adjust the position of the attachment unit 311 more accurately with the adjustment jig 1 to be described later. Note that in the present embodiment, the center position of the attachment unit 311 is the center position of the four bolt holes.

Note that the configuration of the attachment unit 311 can be changed appropriately. For example, the entire region of the attachment unit 311 that faces the base portion 3520 when the sensor unit 35 is attached do not have to be made up of a flat surface. Further, in the present embodiment, the description has been given with regard to the case where the attachment unit 311 is formed on the vehicle body frame 31 of the vehicle 3. However, the attachment unit 311 may be formed on a member such as a bracket attached to the vehicle body frame 31.

Figure 6:
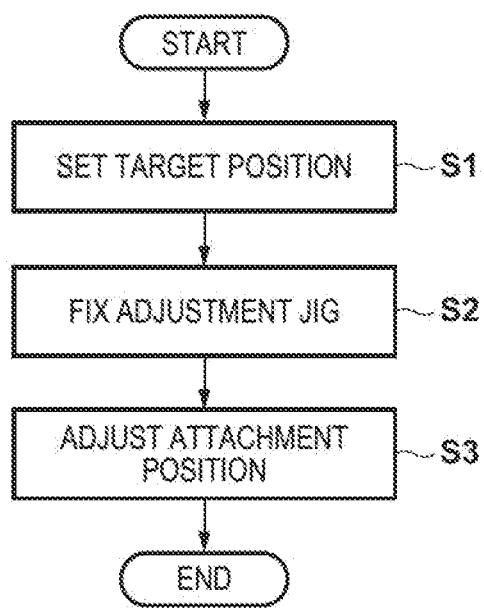
FIG. 6 is a flowchart illustrating a position adjustment method for an attachment unit using the adjustment jig.
Figure 7:
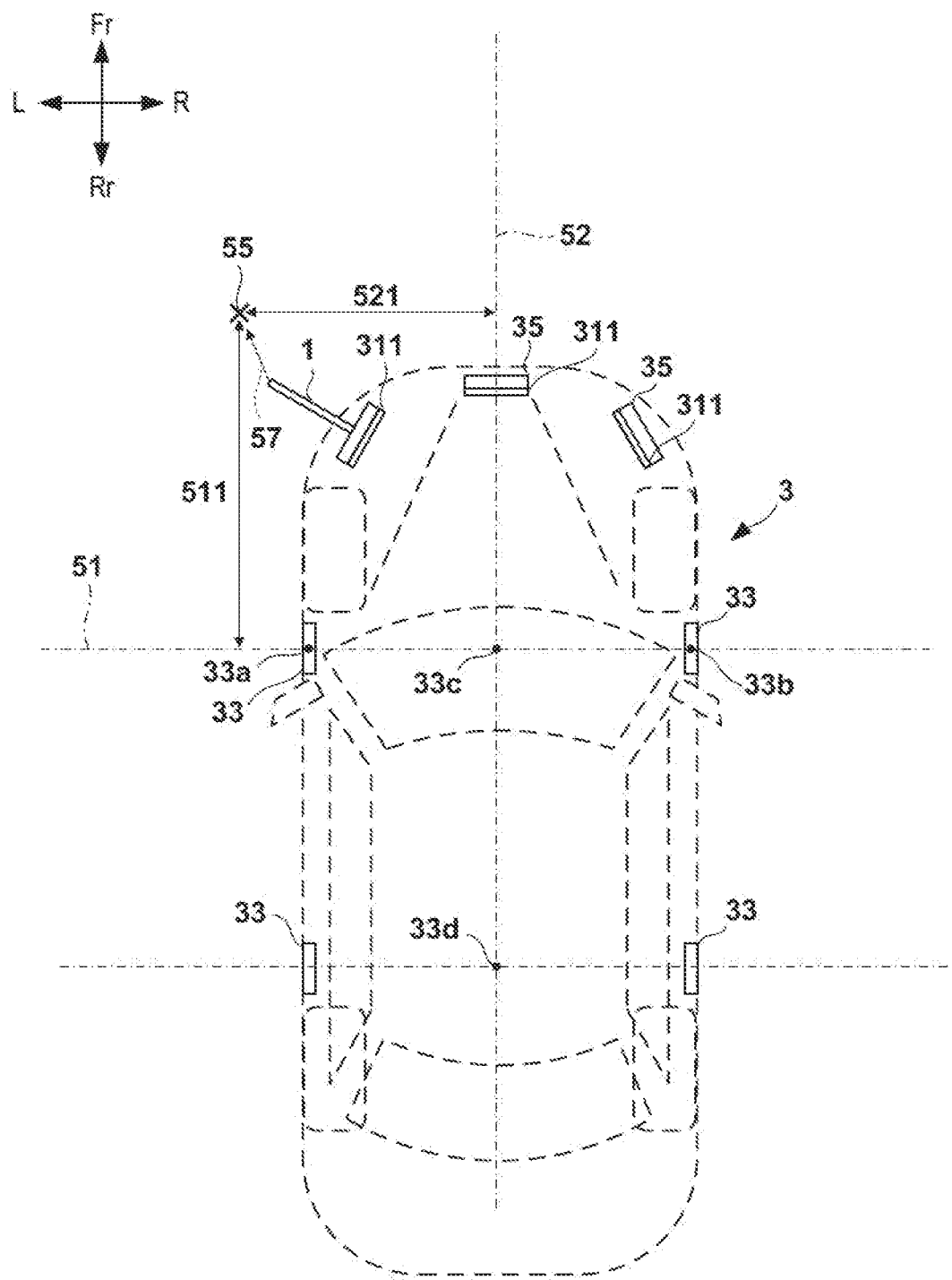
FIG. 7 is a plan view for describing a position adjustment of the attachment unit.
Figure 8:
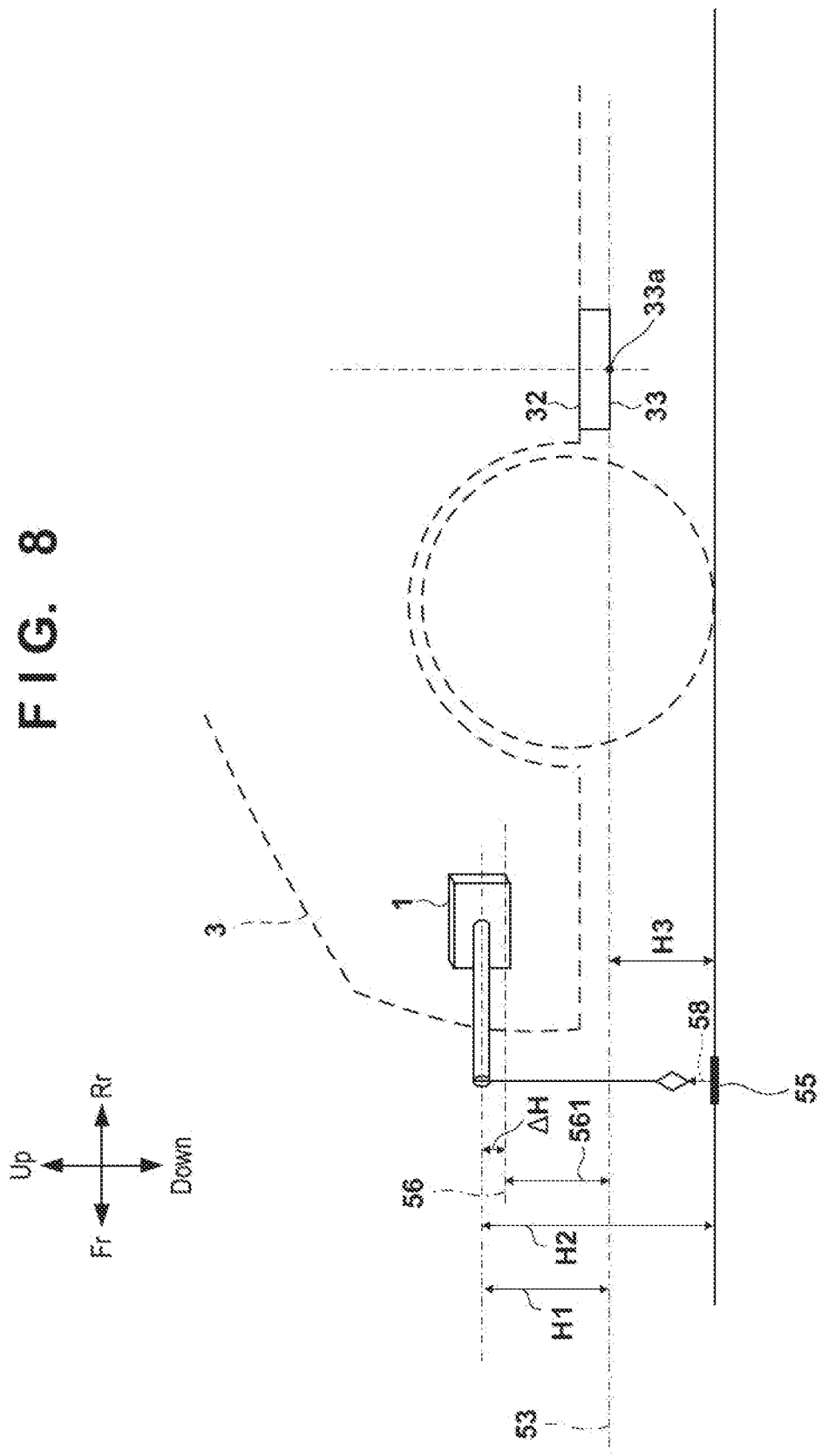
FIG. 8 is a side view for describing the position adjustment of the attachment unit.

Adjustment Method Using Jig (FIGS. 6 to 8)

FIG. 6 is a flowchart illustrating a position adjustment method of the attachment unit 311 using the adjustment jig 1. In addition, FIG. 7 is a plan view for describing the position adjustment of the attachment unit 311. Further, FIG. 8 is a side view for describing the position adjustment of the attachment unit 311. Note that in FIGS. 7 and 8, "front (Fr)", "rear (Rr)", "left (L)", "right (R)", "Up", and "Down" are directions when viewed from the driver. In addition, FIGS. 7 and 8 illustrate, as an example, the position adjustment of the attachment unit 311 of the sensor unit 35 on the left front side. Note that FIG. 7 illustrates a state after the adjustment jig 1 has been fixed to the attachment unit 311 in step S2 (hereinafter, simply referred to as S2, and the same applies to other steps). FIG. 8 illustrates a state after the suspension unit 13 has been adjusted in S33.

The position adjustment with use of the adjustment jig 1 is conducted to suppress a deviation of the detection range of the sensor unit 35, for example, when deformation occurs in the vehicle body frame 31 or the like due to a collision or the like of the vehicle 3.

In S1, a worker sets a target position. More specifically speaking, the worker sets the target position of the position indicated by the tip end portion 1321 of the weight 132, in the position adjustment of the attachment unit 311. In the present embodiment, the target position is set on the lower side of a side sill 32 with reference to jack points 33 provided on the vehicle center side of the left, right, front, and rear tires of the vehicle 3.

As a specific example, first, the worker sets, as a width direction reference line 51, a straight line that passes through a center position 33a of the jack point 33 in a front-and-rear direction in close proximity to the left front wheel and a center position 33b of the jack point 33 in the front-and-rear direction in close proximity to the light front wheel. In addition, the worker sets, as a front-and-rear direction reference line 52, a straight line that passes through a center position 33c of the jack points 33 in a width direction respectively in close proximity to the left and right front wheels and a center position 33d of the jack points 33 in the width direction respectively in close proximity to the left and right rear wheels. Then, the worker sets a point at a distance 511 from the width direction reference line 51 and a distance 521 from the front-and-rear direction reference line 52 as a target position in a horizontal direction. For example, the worker provides a marker 55 at the target position. Note that the distance 511 and the distance 521 can be set, based on a position or an angle of the attachment unit 311 on the vehicle 3, a length of the extension unit 12, or the like.

In addition, the worker sets, as an up-and-down direction reference line 53, a straight line that passes through respective lower ends of the front and rear jack points 33 on the left side. Then, the worker sets, as a target position 56 in a height direction, a position (height) in the up-and-down direction at a distance 561 from the up-and-down direction reference line 53. The distance 561 can be determined beforehand by a positional relationship or the like between the jack points 33 and the attachment unit 311. Here, the distance from the ground on which the vehicle 3 is placed to the target position 56 can differ depending on the situation of a work, such as jacking up or not jacking up. For this reason, in the present embodiment, the target position 56 is set with reference to the up-and-down direction reference line 53.

Note that the method for setting the target position that has been described as an example can be changed appropriately. For example, a part other than the jack points 33 of the vehicle 3 may be used as reference for setting the target position. However, the jack points 33 are parts having relatively high rigidity in the vehicle 3, and thus there is a high possibility that the deformation is suppressed as compared with other parts, even in a case where deformation that needs the position adjustment of the attachment unit 311 occurs in the vehicle body frame 31 or the like. Therefore, the accuracy in the position adjustment can be ensured with the jack points 33 used as reference.

In S2, the worker fixes the adjustment jig 1. Specifically, the fixing unit 11 of the adjustment jig 1 is fixed to the attachment unit 311 by bolt fastening. In addition, in the present embodiment, the fixing unit 11 is fixed to the attachment unit 311 in a state in which the marker 1121 of the alignment portion 112 provided in the fixing unit 11 is aligned with the marker 3111 on the attachment unit 311 side. Accordingly, the center position of the fixing unit 11 and the center position of the attachment unit 311 coincide with each other, when viewed in the axial direction of the body portion 121.

Figure 9:
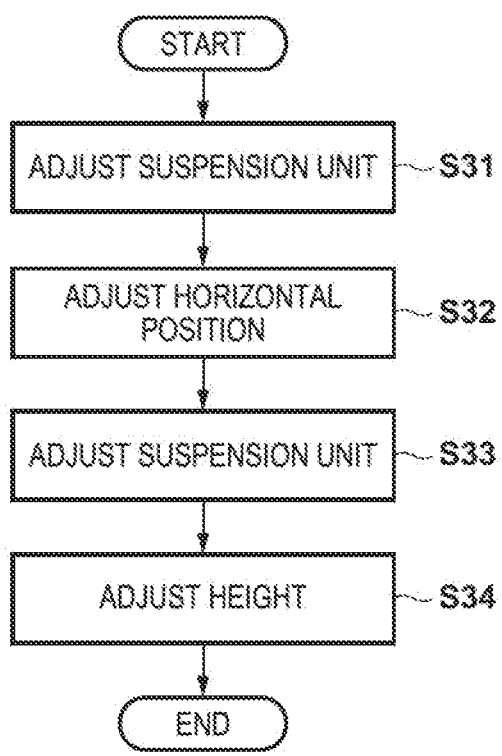
FIG. 9 is a flowchart illustrating an example of an attachment position adjustment of the attachment unit.

In S3, the worker adjusts the position of the attachment unit 311. FIG. 9 is a flowchart illustrating an example of an attachment position adjustment of the attachment unit 311, and illustrates a specific example of step S3.

In S31, the worker adjusts the suspension unit 13 to adjust the horizontal position of the attachment unit 311. For example, in a state in which the fixing unit 11 is fixed to the attachment unit 311 in S2, the worker adjusts the position of the weight 132 with use of the distance adjustment unit 1212 so that the tip end portion 1321 of the weight 132 of the suspension unit 13 is brought into contact with the surface provided with the marker 55 at the target position.

In S32, the worker adjusts the horizontal position. The worker adjusts the horizontal position so that the tip end portion 1321 of the weight 132 coincides with the marker 55 at the target position. For example, the worker grips the extension unit 12, and applies force to the fixing unit 11 to displace the attachment unit 311, to which the fixing unit 11 is fixed, and to horizontally adjust the attachment unit 311. In the example of FIG. 7, the worker applies the force in the direction of an arrow 57.

In step S33, the worker adjusts the suspension unit 13 to adjust the position (the height) in the up-and-down direction of the attachment unit 311. As an example, first, a distance H1 from the up-and-down direction reference line 53 to the tip end portion 123 of the extension unit 12 is calculated. For example, the worker measures a distance H2 from the tip end portion 123 of the extension unit 12 to the ground and a distance H3 from the up-and-down direction reference line 53 to the ground by a known method using a laser type distance measuring sensor, a caliper, a scale, or the like, and calculates the distance H1 from these differences. Next, a difference ΔH between a current height and the target height is calculated from the distance 561 from the up-and-down direction reference line 53 to the target position 56 in the height direction and the distance H1. That is, it can be said that the difference ΔH is a deviation of a current position of the attachment unit 311 from the target height. Then, the length of a suspended part of the linear member 131 is moved by the difference ΔH with use of the distance adjustment unit 1212. In the example of FIG. 8, the length of the suspended part from the extension unit 12 of the linear member 131 is shortened by the difference ΔH in the direction of an arrow 58 from the state in which the tip end portion 1321 is in contact with the marker 55 at the target position by the steps up to S32.

In S34, the worker adjusts the height. The worker adjusts the height so that the tip end portion 1321 of the weight 132 coincides with the marker 55 at the target position. For example, the worker grips the extension unit 12, and applies force to the fixing unit 11 to displace the attachment unit 311, to which the fixing unit 11 is fixed, and to adjust the height of the attachment unit 311. In the example of FIG. 8, the worker applies force to the adjustment jig 1 in a downward direction from the state illustrated in the drawing to make an adjustment so that the tip end portion 1321 is brought into contact with the grounding surface of the marker 55.

As described heretofore, according to the present embodiment, the tip end portion 1321 of the weight 132 is aligned with the marker 55 at the target position with use of the adjustment jig 1, and thus the attachment unit 311 can be adjusted. Therefore, it is possible to easily adjust the attachment unit of the external sensor such as the sensor unit 35.

Another Embodiment

Figure 10:
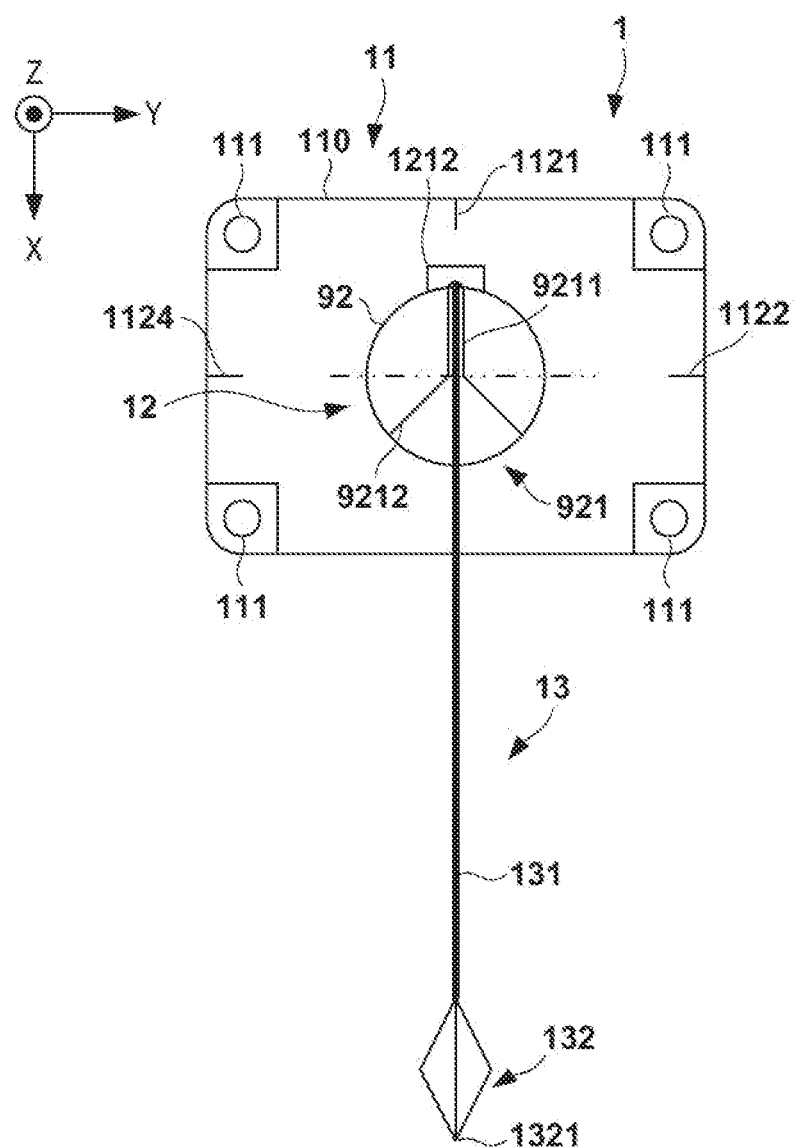
FIG. 10 is a view illustrating an extension unit according to a modification.

FIG. 10 is a view illustrating the tip end portion of the extension unit 12 according to a modification. In the modification of FIG. 10, the configuration of a tip end portion 92 of the extension unit 12 is different from the configuration of the tip end portion 123 in the above-described embodiment. Hereinafter, the same components as those in the above-described embodiment are denoted by the same reference numerals, and the descriptions thereof will be omitted.

In an example of FIG. 10, a groove portion 921 used as a guide portion is formed on an end surface of the tip end portion 92 of the extension unit 12. In addition, the groove portion 921 includes an upper part 9211, which is formed between an upper end and a center of the tip end portion 92, and a lower part 9212, which is formed to be wider than the upper part 9211 on a lower side of the upper part 9211, when viewed in the axial direction of the extension unit 12, in a state in which the fixing unit 11 is fixed to the attachment unit 311.

In the modification illustrated in FIG. 10, the linear member 131 is guided by the upper part 9211 from the upper end to the center of the tip end portion 92. On the other hand, the lower part 9212 on the lower side from the center of the tip end portion 92 is formed to be wider, the linear member 131 is suspended directly from the center of the tip end portion 92, even in a state in which the adjustment jig 1 is inclined. Here, the adjustment jig 1 is configured such that the center of the tip end portion 92 and the center of the fixing unit 11 coincide with each other, when viewed in the axial direction of the extension unit 12. Therefore, in the modification illustrated in FIG. 10, even in the state in which the adjustment jig 1 is inclined, the height from the center of the fixing unit 11 to the ground is adjustable with accuracy.

Note that the shape and the like of the lower part 9212 can be changed appropriately. In addition, in the example illustrated in FIG. 10, the lower part 9212 spreads downward in a fan shape. However, a configuration in which a fan-shaped part spreads either narrower or wider can be adopted.

Further, in the above-described embodiment or the modification of FIG. 10, the guide portion that guides the linear member 131 is a groove formed in the tip end portion 123 or the tip end portion 92. However, the configuration of the guide portion is not limited to this. For example, the guide portion may be a protruding part provided on the tip end surface of the extension unit 12.

Furthermore, in the above-described embodiments, the outer shape of the extension unit 12 is a round bar shape. However, the outer shape of the extension unit 12 can be changed appropriately. For example, the extension unit 12 may have a bar shape having a polygonal cross-section. In addition, the thickness of the extension unit 12 may vary depending on the part. Further, an uneven part or a flange-shaped part may be provided so that the adjustment jig 1 can be easily operated.

Summary of Embodiments

The above-described embodiments disclose at least an adjustment jig and an adjustment method to be described as follows.

1. An adjustment jig (for example, 1) in the above-described embodiment includes:

a fixing unit (for example, 11) having a plate shape and configured to be detachably fixed to an attachment unit of a sensor provided on a vehicle side;

an extension unit (for example, 12) provided to extend from the fixing unit; and a suspension unit (for example, 13) configured to be suspended from the extension unit.

According to this embodiment, the adjustment jig including the suspension unit enables the position adjustment of the attachment unit of the external sensor, and thus easily enables the adjustment of the attachment unit of the external sensor.

2. According to the above-described embodiment, the suspension unit includes a linear member (for example, 131) attached to the extension unit, and a weight (for example, 132) attached to one end of the linear member, and the extension unit includes a distance adjustment unit (for example, 1212) configured to hold the linear member to be capable of adjusting a distance from the extension unit to the weight.

According to this embodiment, the distance from the extension unit to the weight can be changed, so the accuracy in alignment of the attachment unit in the height direction can be improved.

3. According to the above-described embodiment, the extension unit includes a scale (for example, 1211) for measuring a distance of the weight from the extension unit in a vertical direction, and the linear member is provided with a marker (for example, 1312) for reading the scale.

According to this embodiment, the length of the part of the suspension unit suspended from the extension unit can be grasped by the marker and the scale.

4. According to the above-described embodiment, the fixing unit includes an alignment portion (for example, 112) capable of being aligned with the attachment unit.

According to this embodiment, the accuracy in the position adjustment can be improved.

5. According to the above-described embodiment, the suspension unit includes a linear member (for example, 131) attached to the extension unit, and a weight (for example, 132) attached to one end of the linear member, the extension unit has a rod shape, and the extension unit includes a guide portion (for example, 1231) configured to guide the linear member such that the linear member passes through a center of a tip end portion (for example, 123) on an opposite side to a connection end portion (for example, 122) connected with the fixing unit.

According to this embodiment, the linear member is suspended immediately below from the center of the tip end portion that coincides with the center of the attachment unit, when viewed in the axial direction, and thus the accuracy in the position adjustment can be improved.

6. According to the above-described embodiment, the guide portion is a groove portion (for example, 921) formed in the tip end portion, and the groove portion includes a first part (for example, 9211) formed from an upper end of the tip end portion to the center, and a second part (for example, 9212) formed on a lower side of the first part, the second part being larger in width than the first part, when the groove portion is viewed in a state in which the fixing unit is fixed to the attachment unit.

According to this embodiment, even in a state in which the fixing unit 11 is inclined, the weight of the suspension unit indicates a position directly below the center of the tip end portion, so the accuracy in the position adjustment can be improved.

7. According to the above-described embodiment, the extension unit is welded with the fixing unit.

According to this embodiment, the extension unit can be firmly fixed with the fixing unit.

8. An adjustment method in the above-described embodiment includes:

setting a target position in a position adjustment of the attachment unit (for example, S1);

fixing the fixing unit to the attachment unit (for example, S2); and adjusting a position of the adjustment jig to make the target position set in the setting coincide with a position indicated by the suspension unit (for example, S3).

According to this embodiment, the adjustment jig including the suspension unit enables the position adjustment of the attachment unit of the external sensor, and thus easily enables the adjustment of the attachment unit of the external sensor.

The invention is not limited to the foregoing embodiments, and various variations/changes are possible within the spirit of the invention.

What is claimed is:

1. An adjustment jig comprising:
a fixing unit having a plate shape and configured to be detachably fixed to an attachment unit of a sensor provided on a vehicle side;
an extension unit provided to extend from the fixing unit; and
a suspension unit configured to be suspended from the extension unit.

2. The adjustment jig according to claim 1, wherein
the suspension unit includes a linear member attached to the extension unit, and a weight attached to one end of the linear member, and
the extension unit includes a distance adjustment unit configured to hold the linear member to be capable of adjusting a distance from the extension unit to the weight.

3. The adjustment jig according to claim 2, wherein
the extension unit includes a scale for measuring a distance of the weight from the extension unit in a vertical direction, and
the linear member is provided with a marker for reading the scale.

4. The adjustment jig according to claim 1, wherein
the fixing unit includes an alignment portion capable of being aligned with the attachment unit.

5. The adjustment jig according to claim 1, wherein
the suspension unit includes a linear member attached to the extension unit, and a weight attached to one end of the linear member,
the extension unit has a rod shape, and
the extension unit includes a guide portion configured to guide the linear member such that the linear member passes through a center of a tip end portion on an opposite side to a connection end portion connected with the fixing unit.

6. The adjustment jig according to claim 5, wherein
the guide portion is a groove portion formed in the tip end portion, and
the groove portion includes a first part formed from an upper end of the tip end portion to the center, and a second part formed on a lower side of the first part, the second part being larger in width than the first part, when the groove portion is viewed in a state in which the fixing unit is fixed to the attachment unit.

7. The adjustment jig according to claim 1, wherein
the extension unit is welded with the fixing unit.

8. An adjustment method using the adjustment jig of claim 1, the adjustment method comprising:
setting a target position in a position adjustment of the attachment unit;
fixing the fixing unit to the attachment unit; and
adjusting a position of the adjustment jig to make the target position set in the setting coincide with a position indicated by the suspension unit.

* * * * *